United States Patent
Boyer

(10) Patent No.: US 7,134,447 B2
(45) Date of Patent: Nov. 14, 2006

(54) GAS PRESSURE REGULATOR

(75) Inventor: Robert A. Boyer, Flower Mound, TX (US)

(73) Assignee: Victor Equipment Company, St. Louis, MO (US)

( * ) Notice: Subject to any disclaimer, the term of this patent is extended or adjusted under 35 U.S.C. 154(b) by 1034 days.

(21) Appl. No.: 10/301,889

(22) Filed: Nov. 22, 2002

(65) Prior Publication Data

US 2004/0099312 A1  May 27, 2004

(51) Int. Cl.
G05D 16/16 (2006.01)
F16K 31/12 (2006.01)

(52) U.S. Cl. ............ 137/491; 137/489.5; 137/492.5; 251/28; 251/282

(58) Field of Classification Search ........... 137/489, 137/489.5, 491, 492, 492.5; 251/28, 282
See application file for complete search history.

(56) References Cited

U.S. PATENT DOCUMENTS

| | | | |
|---|---|---|---|
| 2,523,826 A | 9/1950 | Heinzelman | |
| 2,890,714 A | 6/1959 | Greenwood et al. | |
| 3,338,518 A | 8/1967 | Barbier | |
| 3,800,822 A | 4/1974 | Baker | |
| 3,897,802 A | 8/1975 | Bass | |
| 4,149,559 A | 4/1979 | Wormser | |
| 4,197,877 A | 4/1980 | Winiasz | |
| 4,442,680 A | 4/1984 | Barbier et al. | |
| 4,552,173 A | 11/1985 | Vayra | |
| 4,679,582 A | 7/1987 | Zwicker | |
| 5,131,425 A | 7/1992 | Sturgis | |
| 5,490,539 A | 2/1996 | Ottestad | |
| 6,161,570 A | 12/2000 | McNeely | |
| 6,318,406 B1 | 11/2001 | Conley | |
| 6,820,641 B1 * | 11/2004 | Larsen | ............ 137/491 |

OTHER PUBLICATIONS

TESCOM Corporation, High Pressure Dome Loaded/Pressure Reducing 44-4200 Series brochure, Form 1613, 2 pages, Elk River, Minnesota (date unknown) (admitted to be prior art).
ADVANCED Specialty Gas Equipment, Ultra High Flow, Pilot-Dome Loaded Regulator (DL Series) brochure, 1 page, Middlesex, New Jersey (date unknown) (admitted to be prior art).
Dynamic Controls, Dycon Series 5000 Control Valves, viewed Aug. 5, 2002, 3 pages, available at http://ww.dynamiccontrols.co.uk/5000.htm (admitted to be prior art).

(Continued)

Primary Examiner—Ramesh Krishnamurthy
(74) Attorney, Agent, or Firm—Thompson Coburn LLP

(57) ABSTRACT

A gas pressure regulator has an inlet for connection to an upstream gas line for flow of gas into the regulator under pressure and an outlet for connection to a downstream gas line for flow of gas out of the regulator at a reduced pressure. A pilot mechanism delivers a desired pilot gas pressure through a pilot passage. A main valve mechanism regulates the flow of gas through a main flow passage connecting the inlet and outlet of the regulator. The regulator has a piston chamber, and a piston operatively connected to the main valve mechanism and movable in the piston chamber. The main valve mechanism has a passageway between the piston chamber and the pilot passage whereby the pilot gas pressure is adapted to move the piston and thereby position the main valve mechanism to regulate the gas pressure at the outlet of the regulator.

26 Claims, 8 Drawing Sheets

OTHER PUBLICATIONS

Dynamic Controls, Dycon Series 5000 brochure, 2 pages, Oldham, United Kingdom (date unknown) (admitted to be prior art).

TEMCO Inc., Temco Back Pressure Regulators Dome Loaded BP Series, viewed Aug. 5, 2002, 1 page, available at http://www.temco.com/tempstuff/bprbp1.htm (admitted to be prior art).

GO Regulator, Inc., Dome Loaded Regulators, 1 page, viewed Aug. 5, 2002, available at http://www.goreg.com/catalog/pr/dome/dome.htm (admitted to be prior art).

Parker Hanifan Corporation, SQServo, Pressure Regulator for High Purity Applications brochure, Revision 4, Sep. 1999, 4 pages, Richmond, California.

Hale Hamilton, Dome Loaded Balanced Controllers RH20 and RH30 Series brochure, 2 pages, Middlesex, England (date unknown) (admitted to be prior art).

Circle Seal Controls, Inc., High Flow Dome Loaded Back Pressure Regulator BPR21 Series brochure, Jul. 1999, 2 pages, Corona, California.

* cited by examiner

1

GAS PRESSURE REGULATOR

BACKGROUND OF THE INVENTION

The present invention relates generally to a gas pressure regulator, and more particularly to a "dome loaded" pressure regulator having an internal pilot mechanism.

One application for this invention is industrial laser applications where high gas flows are required at nearly constant pressures. One type of industrial laser application is laser cutting that typically uses a $CO_2$ laser requiring a lasing gas that generates the laser beam and process, or assist gas, that is directed to the workpiece. Typical process gases include oxygen for cutting carbon steel and nitrogen for cutting stainless steel and alloys. Regardless of the gas used, all lasers require high process flows at an almost constant pressure to insure safe and efficient operation of the cutting apparatus. Typical laser cutting apparatus requires process gas flows as high as approximately 10,000 to 20,000 SCFH at delivery pressures up to approximately 500 PSIG.

Preferred methods for supplying process gas at high flows and constant operating pressures include using a "dome loaded" regulator in combination with an external pilot pressure regulator. A typical dome loaded regulator has a dome piston attached to a main valve that provides pressure regulation between the inlet and outlet of the regulator. Typically, a constant pressure is supplied to the top of the dome piston by a pilot regulator that receives a supply of gas from an external source connected to the inlet of the regulator. The pilot regulator supplies gas at a preselected reduced pilot pressure to an external connection on the dome regulator so that a constant downward force is applied to the dome piston. In response to the downward force from the pilot pressure acting on the dome piston, the main valve opens to allow gas to flow though the regulator at a reduced pressure. Gas flowing through the regulator applies an upward force on the bottom side of the piston to balance the constant downward force from the pilot regulator. The dome loaded regulator is configured such that pressure of the exiting gas acting on the bottom of the piston is equivalent to the pilot pressure acting on the top of the dome piston. As gas is consumed downstream of the regulator, the main valve modulates to maintain the force balance on the dome piston. For example, when gas consumption increases the outlet gas pressure starts to drop and the main valve opens allowing an increase in the volume of gas exiting the regulator. Contrastingly, when gas consumption decreases the outlet gas pressure starts to rise and the main valve closes to reduce the volume of gas exiting the regulator. The modulation of the main valve allows the regulator to maintain a constant outlet pressure throughout relatively large gas flow ranges.

Existing dome loaded regulators with external pilot regulators require external piping from the gas source to the pilot regulator and from the pilot regulator to the dome loaded regulator. The external piping required to accommodate the pilot regulator complicates the installation and increases both manufacturing and installations costs of the gas supply system. Also, the required additional pipe fittings increase the number of leak points in the gas supply system which can impact performance of the pressure regulator. Frequently, the dome loaded regulator and separate pilot regulator are mounted on a common bracket that requires additional support to accommodate the size and weight of both the dome regulator and pilot regulator.

SUMMARY OF THE INVENTION

Among the several objects of this invention may be noted the provision of a gas pressure regulator which can provide high gas flows at constant supply pressures; the provision of such a regulator which simplifies installation; the provision of such a regulator which simplifies mounting; the provision of such a regulator which reduces leak points; and the provision of such a regulator which is compact and lightweight.

In general, a gas pressure regulator of the present invention comprises a regulator body having an inlet for connection to an upstream gas line for flow of gas into the regulator body under pressure and an outlet for connection to a downstream gas line for flow of gas out of the regulator body at a reduced pressure. A pilot mechanism in the regulator body comprises a pilot passage communicating with the inlet, a pilot valve seat in the pilot passage, a pilot valve member in the pilot passage movable relative to the seat, and a pilot control device. The pilot control device positions the pilot valve member and the pilot valve seat relative to one another to adjust the pressure of gas delivered past the pilot valve seat to a desired pilot gas pressure. A main valve mechanism in the regulator body regulates the flow of gas under pressure from the inlet to the outlet. The main valve mechanism comprises a main flow passage connecting the inlet and outlet of the regulator body, a main valve seat in the main flow passage, and a main valve member in the main flow passage movable relative to the main valve seat. A piston chamber is located in the regulator body. A piston operatively connected to the main valve member is movable in the piston chamber. The main valve member has a passageway therein providing pressure communication between the piston chamber and the pilot passage at a location downstream from the pilot valve seat. The pilot gas pressure is adapted to move the piston and thereby position the main valve member in relation to the main valve seat for regulating the pressure of the gas delivered from the inlet to the outlet of the regulator.

Other objects and features will be in part apparent and in part pointed out hereinafter.

BRIEF DESCRIPTION OF THE DRAWINGS

Corresponding parts are designated by corresponding reference numbers throughout the drawings.

DESCRIPTION OF THE PREFERRED EMBODIMENT

Figure 1:
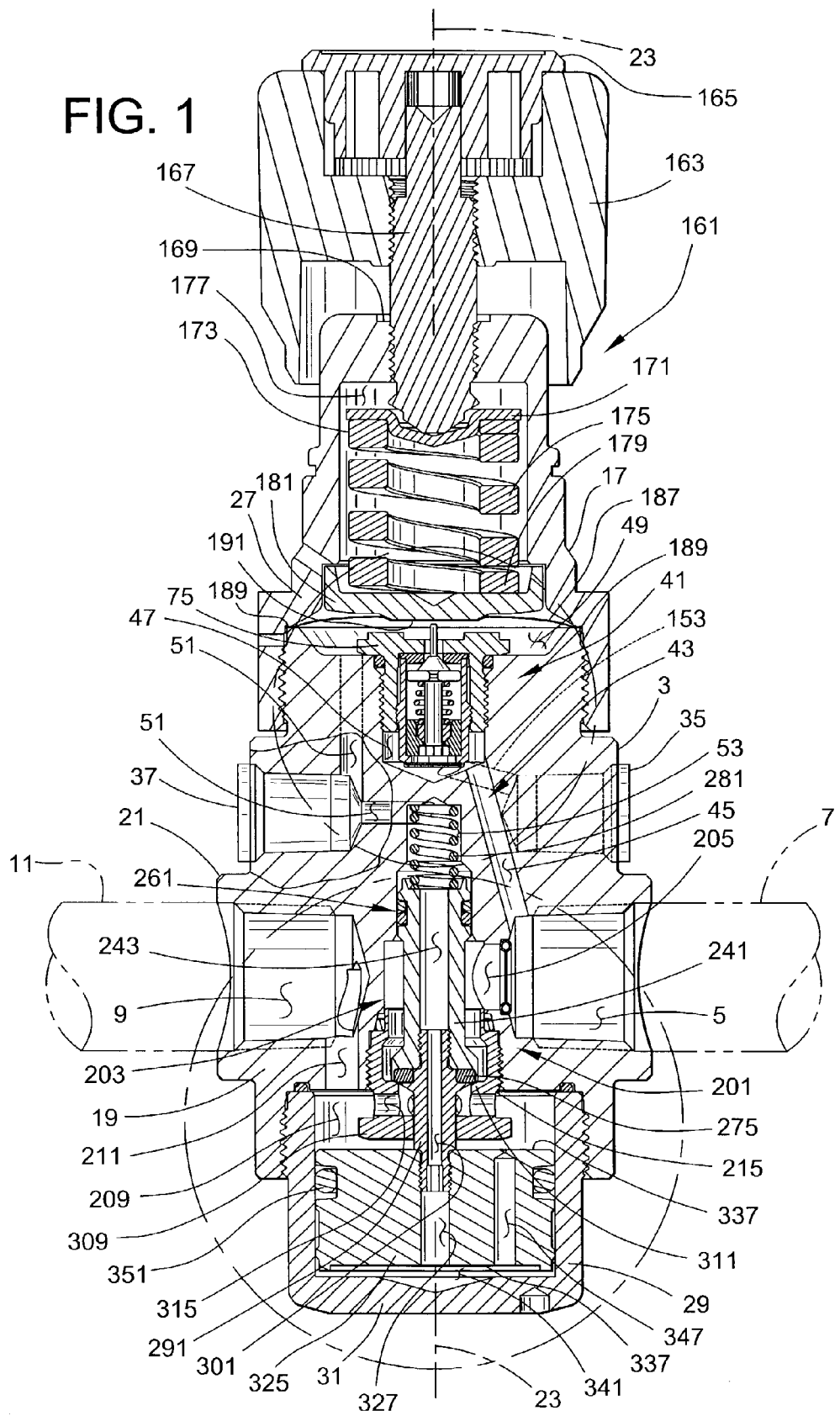
FIG. 1 is a vertical section of a gas pressure regulator of the present invention.

Referring now to the drawings, and more particularly to FIG. 1, a gas pressure regulator of the present invention is designated in its entirety by the reference numeral 1. The regulator 1 has a body 3 with an inlet 5 for connection to an upstream gas line 7 and an outlet 9 for connection to a downstream gas line 11. The regulator 1 supplies a flow of gas through the outlet 9 at a set pressure reduced from the gas pressure at the inlet 5 of the regulator.

In the illustrated embodiment, the regulator body 3 has a first end section 17, a second end section 19 and a central section 21 between the end sections that are generally coaxial with respect to a longitudinal axis 23 of the body. The first end section 17 comprises an upper cap or bonnet 27 and the second end section 19 comprises a cylinder head 29 having a bottom wall 31 defining a closed lower end of the regulator 1. In the preferred embodiment, both the bonnet 27 and the cylinder head 29 are threadably connected to the central section 21 of the body 3. The inlet 5 and the outlet 9 of the regulator 1 are preferably located in the central section 21 of the body. Also, a high pressure port 35 and a low pressure port 37 are provided in the central section 21 to allow connection of pressure gauges (not shown) for convenient monitoring of gas pressures at the inlet 5 and outlet 9 of the regulator 1.

Figure 1A:
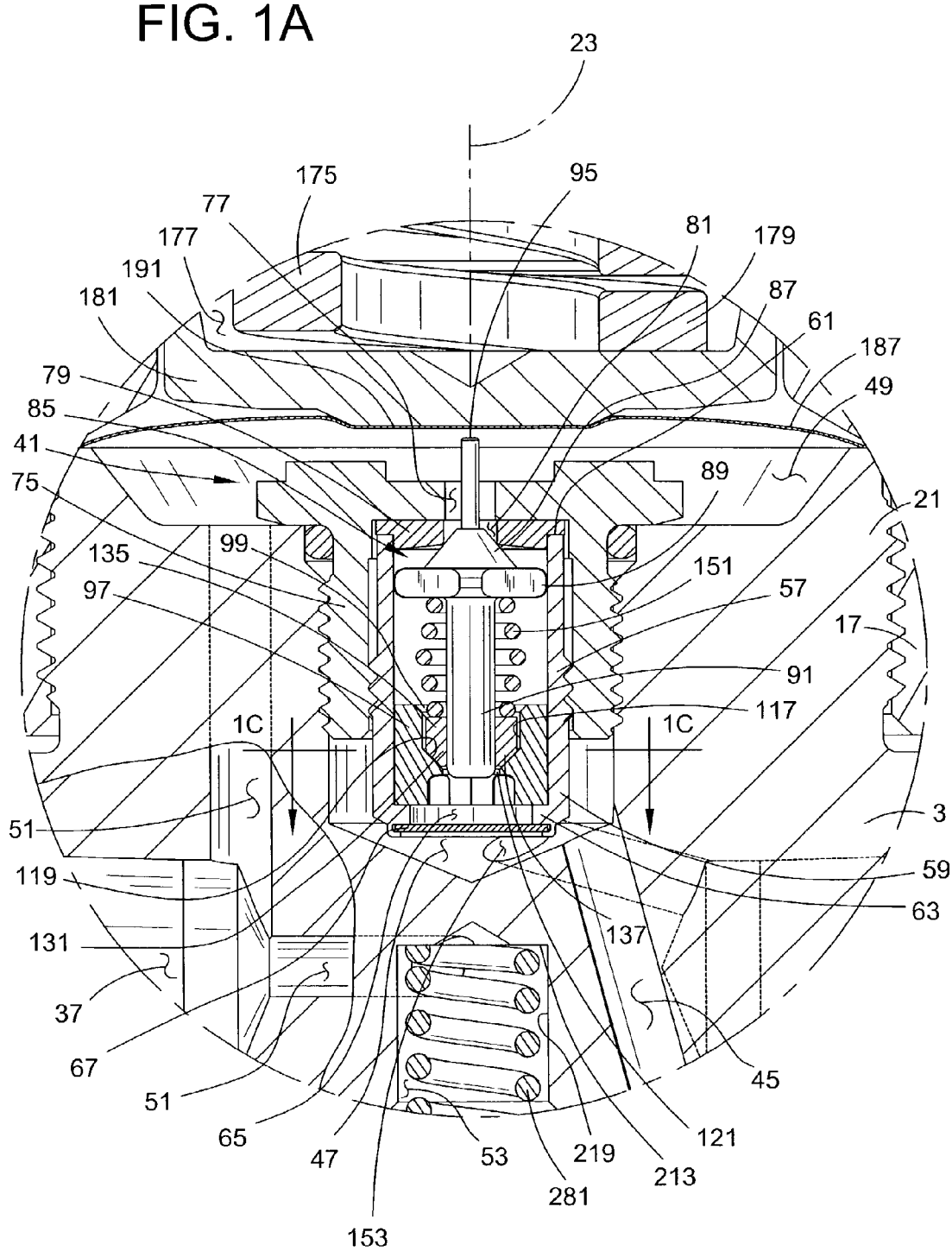
FIG. 1A is an enlarged section of FIG. 1 showing a pilot mechanism of the pressure regulator in a closed position.
Figure 1B:
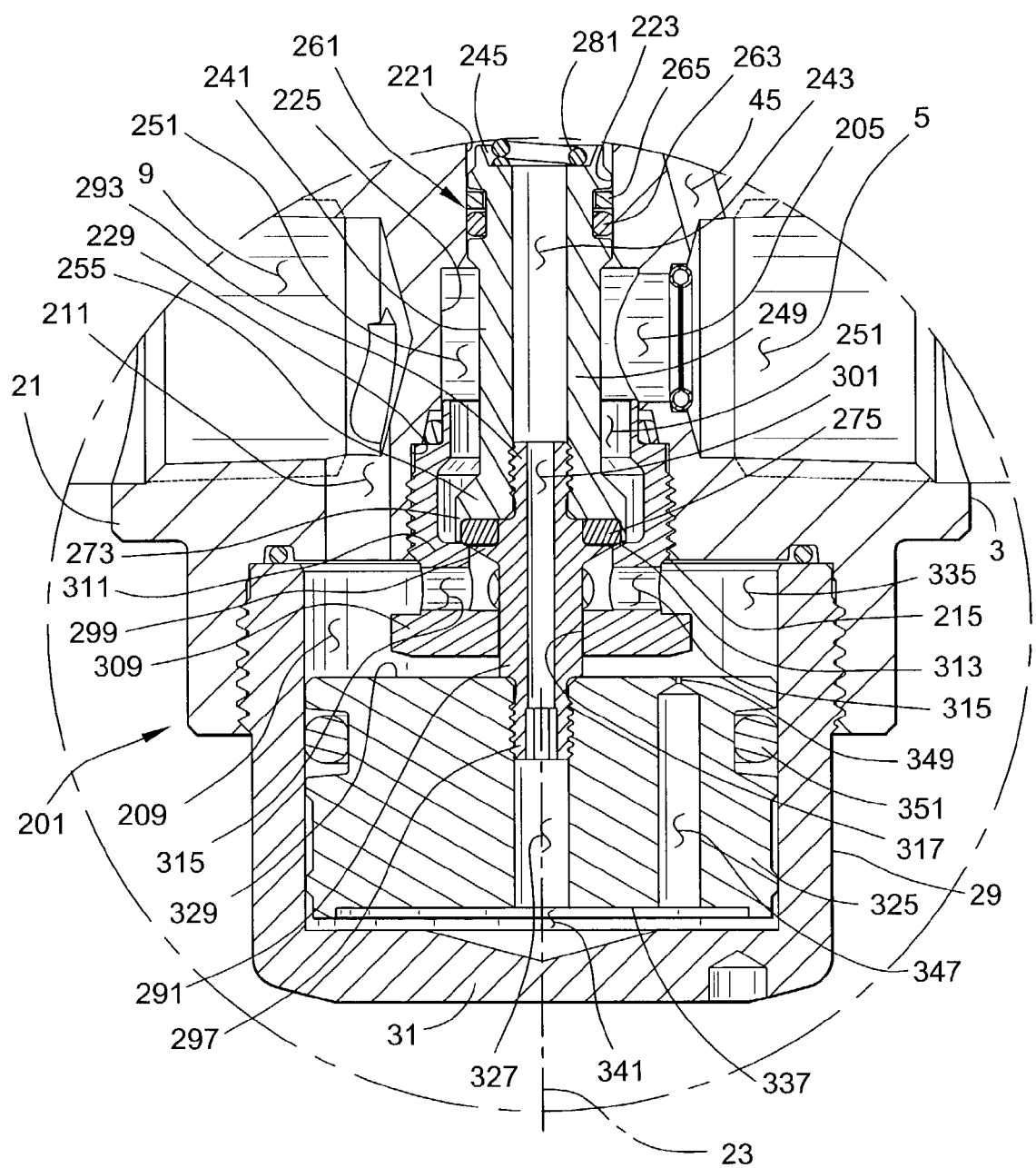
FIG. 1B is an enlarged section of FIG. 1 showing a main valve mechanism of the pressure regulator in a closed position.
Figure 1C:
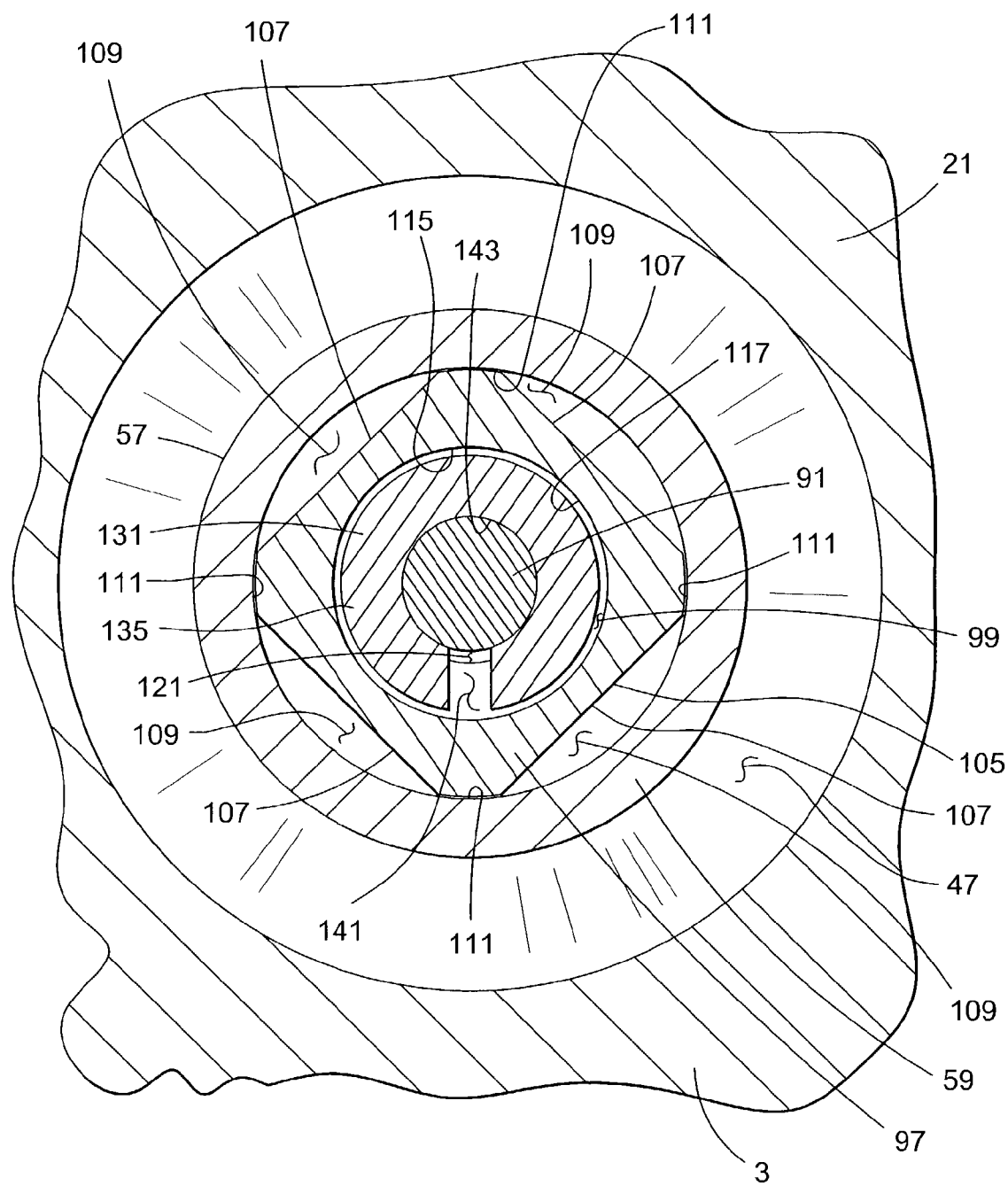
FIG. 1C is cross section taken along the plane including line 1C—1C of FIG. 1A.

A pilot mechanism, generally indicated 41, is located in the central section 21 and first end section 17 of the regulator body 3. The pilot mechanism 41 comprises, in one embodiment, a pilot passage 43 in the central section 21 of the body 3 defined by a pilot inlet bore 45 in communication with the regulator inlet 5, a pilot housing bore 47 axially aligned with the longitudinal axis 23 of the body in communication with the pilot inlet bore, a pilot low pressure cavity 49 disposed above the pilot housing bore, and a pilot exit bore 51 leading from the pilot pressure cavity to a central bore 53 in the regulator body. As shown in FIG. 1A, a pilot housing 57 is received in the pilot housing bore 47. The housing 57 has a generally cylindrical body 59 with an open top 61 and a bottom wall 63 having an inlet opening 65 for receiving gas from the pilot housing bore 47. A filter 67 (e.g., screen) is attached to the bottom wall 63 of the housing 57 to filter gas passing through the opening 65. The pilot housing 57 is retained in the pilot housing bore 47 by a threaded retainer 75 having an opening 77 leading from the pilot housing bore 47 to the pilot low pressure cavity 49. A pilot valve seat 79, preferably of resilient material, is located in the open end 61 of the pilot housing 57 below the retainer 75 and has a central opening 81 aligned with the opening 77 in the retainer. As shown in FIG. 1A, a pilot valve member, generally designated 85, is slidable in the pilot housing 57 and has a truncated conical head 87, a shoulder 89 extending laterally from the base of the head for sliding contact with the housing, and an elongate body 91 below the shoulder. A valve stem 95 extends from the head 87 of the pilot valve member 85 through the opening 81 in the valve seat 79 and the opening 77 in the retainer 75 into the pilot low pressure cavity 49. A spacer 97 located in the pilot housing 57 above the inlet opening 65 has an inner cavity 99 for receiving the flow of gas from the pilot housing bore 47. As shown in FIG. 1C, the spacer 97 has an outer surface 105 with four flat sides 107 spaced in from the cylindrical pilot housing body 59 to create four external passageways 109 for the flow of gas around the spacer and through the pilot housing 57. The flat sides 107 are joined at four rounded corners 111 that are in slidable contact with the cylindrical housing body 59. The spacer 97 has an inner surface 115 defining the inner cavity 99 that has an upper generally cylindrical surface 117 and a lower conical surface 119 converging to an opening 121 leading to the inlet opening 65 of the pilot housing 57. A vibration damper 131 located in the inner cavity 99 of the spacer has a sliding fit on the elongate body 91 of the pilot valve member 85 to dampen harmonic vibrations created by gas flowing through the pilot housing 57. The vibration damper 131 has a solid cylindrical portion 135 spaced in from the upper cylindrical surface 117 of the spacer 97 and lower conical portion 137 supported by the lower conical surface 119 of the spacer. The damper 131 has a slot or open space 141 extending lengthwise of the damper and a round central opening 143 for receiving the elongate body 91 of the pilot valve member 85. The slot 141 allows the damper 131 to compress circumferentially as the damper is forced downward in the inner cavity 99 so that the fit between the elongate body 91 and the central opening 143 is tightened. As shown in FIG. 1A, a pilot spring 151 is located in the pilot housing 57 between the vibration damper 131 and the shoulder 89 to bias the pilot valve member 85 to a closed position in which it seals against the pilot valve seat 79. The pilot spring 151 also biases the vibration damper 131 downward in the inner cavity 99 of the spacer 97 to tighten the engagement between the damper and the valve member 85. In the closed position of the pilot mechanism 41 shown in FIGS. 1 and 1A, gas flows from the regulator inlet 5 through the pilot inlet bore 45 to the pilot housing bore 47, through the inlet opening 65 of the pilot housing 57 and past the filter 67 located in the inlet opening. Gas flows from the inlet opening 65 through the external passageways 109 around the spacer 97 and also through the inner cavity 99 of the spacer and the slot 141 in the damper 131 to fill the pilot housing 57. In the closed position of the pilot mechanism 41, gas is prohibited from escaping the pilot housing 57 by contact of the pilot valve member 85 with the pilot valve seat 79. The inlet gas pressure that is received in the pilot housing bore 47 is communicated to the high pressure port 35 via a gauge passageway 153 in the body 3 so that a pressure gauge (not shown) connected to the high pressure port can display the inlet pressure of the regulator 1.

Figure 2:
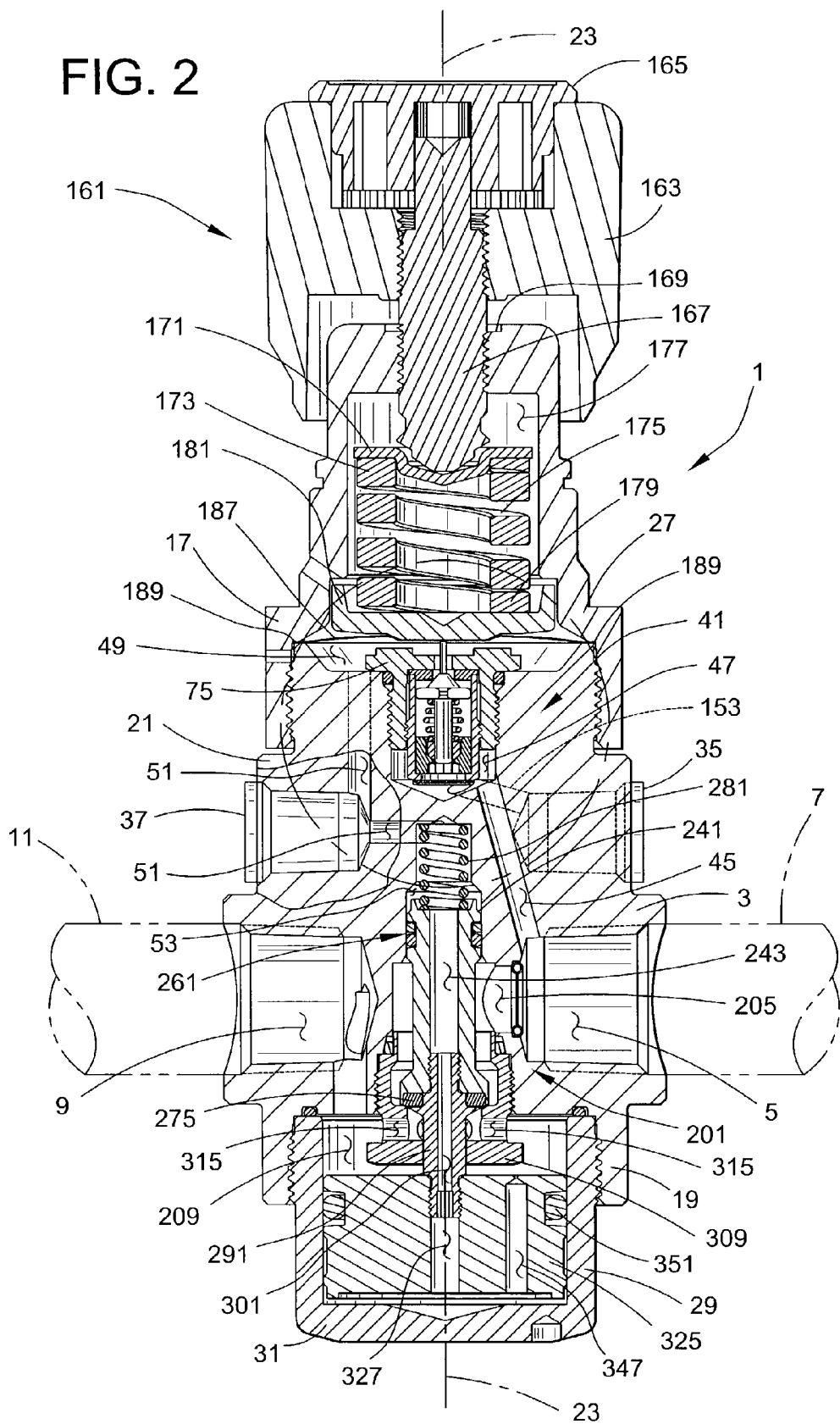
FIG. 2 is a vertical section of the pressure regulator showing the pilot mechanism in an open position.
Figure 2A:
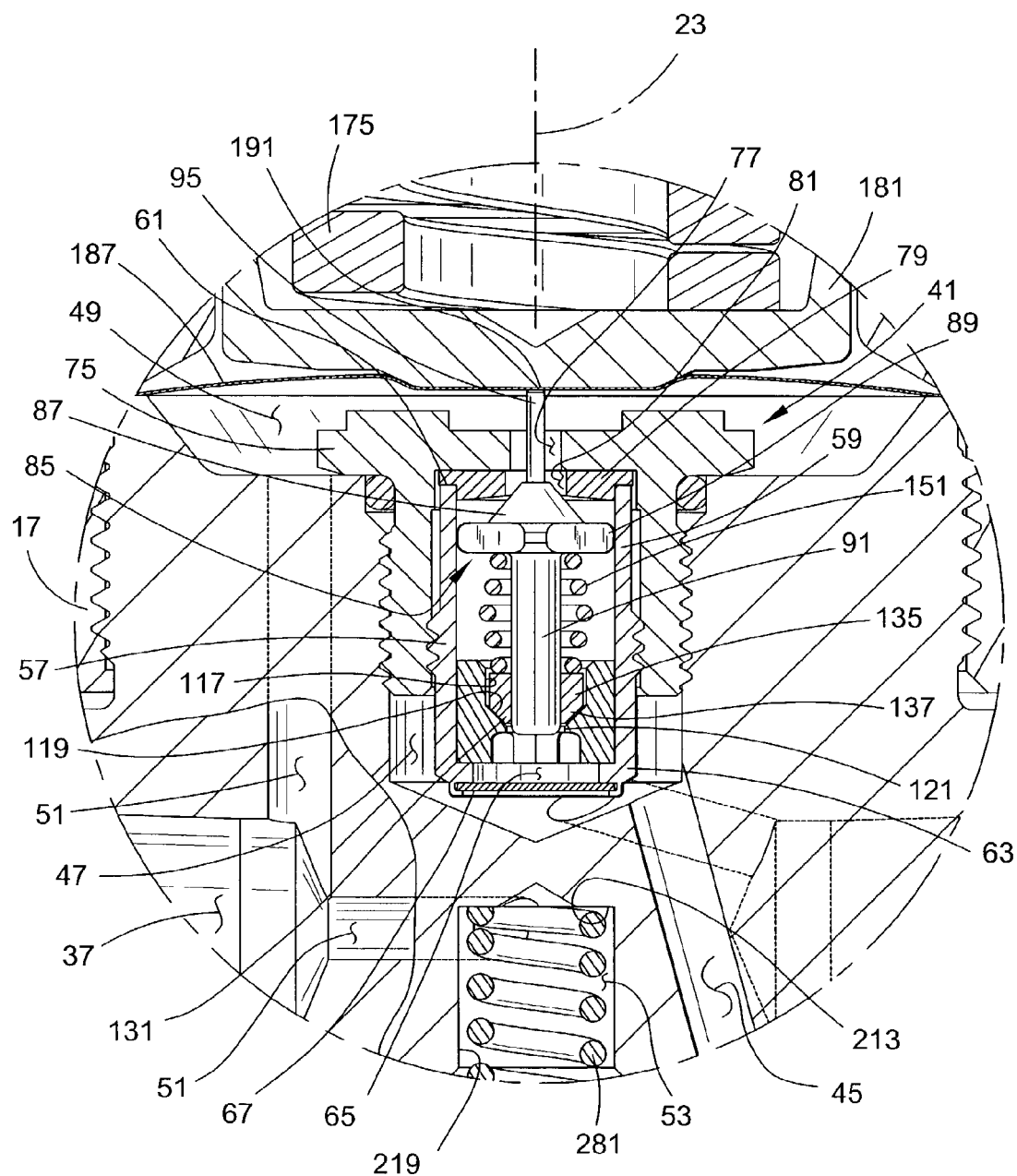
FIG. 2A is an enlarged section of FIG. 2 showing details of the pilot mechanism of the pressure regulator.

As shown in FIG. 1, a pilot valve control mechanism, generally indicated 161, is located in the first end section 17 of the regulator body 3 for adjusting the pressure of gas in the pilot low pressure cavity 49. In the illustrated embodiment, the pilot valve control mechanism 161 comprises an adjusting knob 163 having a central section 165 connected to an adjusting screw 167 threadably received in an axial bore 169 in the bonnet 27 of the regulator body 3. The adjusting screw 167 is threaded down against a first bearing plate 171 which contacts a first end 173 of a spring 175 housed in a cavity 177 in the bonnet 27. The opposite end 179 of the spring 175 bears against a second bearing plate 181 in contact with a diaphragm 187 defining a top wall of the pilot low pressure cavity 49. In the illustrated embodiment, the periphery 189 of the diaphragm 187 is clamped between the bonnet 27 and the central section 21 of the body. As shown in FIGS. 2 and 2A, the central portion 191 of the diaphragm 187 is in contact with the second bearing plate 181, the arrangement being such that turning the adjusting knob 163 threads the adjusting screw 167 and varies the compression of the spring 175 and the amount of force applied by the spring on the second bearing plate and diaphragm. Initially, the downward force applied to the diaphragm 187 forces the diaphragm downward into contact with the valve stem 95. The downward movement of the valve stem 95 forces the head 87 of the pilot valve member 85 away from the pilot valve seat 79 to allow gas from within the pilot housing 57 to pass into the pilot low pressure cavity 49. The gas pressure in the pilot low pressure cavity 49 provides an upward force on the diaphragm 187 that increases until it is sufficient to counteract the downward force of the spring 175 causing the diaphragm to rise. Upward movement of the diaphragm 187 allows the head 87 to move closer to the valve seat 79 to restrict the flow of gas into the pilot low pressure cavity 49. If the pressure in the pilot low pressure cavity 49 is sufficient to cause the diaphragm 187 to fully disengage the valve stem 95, the regulator inlet pressure and the force from the pilot spring 151 bias the pilot valve 85 to its closed position (FIGS. 1 and 1A). In its closed position, the head 87 of the pilot valve 85 again contacts the pilot valve seat 79 to prevent gas flow into the pilot low pressure cavity 49. As described in more detail below, when gas is discharged from the outlet 9 of the regulator the pressure in the pilot low pressure cavity 49 starts to fall, thereby allowing the downward force of the spring 175 to push the diaphragm 187 down into contact with the valve stem 95. The rise and fall of the diaphragm 187 corresponds with the loading and unloading of the pilot low pressure cavity 49 that repeats rapidly to maintain a constant gas pressure under the diaphragm. This constant pressure (i.e., pilot pressure) is set and adjusted by the position of the adjustment knob 163 that determines the amount of compression in the adjusting spring 175 (and thus the amount of force applied to the diaphragm 187). Gas at the set pilot pressure exits the pilot low pressure cavity 49 through the pilot exit bore 51 leading to the central bore 53 of the regulator body 3. The pilot exit bore 51 is also in communication with the low pressure port 37 in the body 3 so that a pressure gauge (not shown) connected to the low pressure port can display the pilot pressure of the regulator 1, which, as will be explained below in more detail, is substantially identical to the outlet pressure of the regulator.

A main valve mechanism, generally indicated 201, is located in the central bore 53 of the regulator body 3 to regulate the flow of gas through a main flow passage, generally indicated 203, that comprises a flow path from the inlet 5 of the regulator 1 to the outlet 9 of the regulator. In the illustrated embodiment, the main flow passage 203 comprises an inlet passageway 205 in the body 3 leading to the central bore 53, a piston chamber 209 below the central bore enclosed by the cylinder head 29, and an outlet passageway 211 in the body leading from the piston chamber to the outlet 9 of the regulator 1. In the illustrated embodiment, the central bore 53 is generally a stepped cylinder having a top wall 213 and an open bottom 215 with four intermediate sections having progressively larger diameters. As shown in FIGS. 1A and 1B, the bore 53 has a first section 219 in communication with the pilot exit bore 51, a second section 221 having an inner wall 223 for sliding contact by the main valve mechanism 201, a third section 225 in communication with the inlet passageway 205, and a fourth lower section 229 opening to the piston chamber 209. In the illustrated embodiment, the main valve mechanism 201 comprises an elongate main valve member 241 located in the central bore 53 having an internal axial bore 243 passing longitudinally through the valve member, a first upper end 245 sealingly slidable in the second section 221 of the central bore, a middle portion 249 spaced from the third section 225 of the central bore to create an annular cavity 251 for receiving gas from the inlet passageway 205, and a second lower end 255 generally located in the fourth section 229 of the central bore. The first end 245 of the valve member 241 has an upper seal, generally indicated 261, in sliding sealing contact with the inner wall 223 in the second section 221 of the central bore 53. In the illustrated embodiment the upper seal 261 is in the form of an O-ring 263 and a back-up ring 265 mounted on the valve member 241 but it will be understood that other seal arrangements can be provided. Preferably, the O-ring 263 is made of Viton® fluorocarbon rubber and the back-up ring 265 is made of a Teflon® material. The second end 255 of the valve member 241 has a lower section with an outwardly flaring portion 273 that receives a lower seal 275 defining the lower end of the valve member 241. Preferably, the lower seal 275 is a resilient annular O-ring made of Viton® fluorocarbon rubber. Alternatively, the lower seal 275 could comprise an O-ring made of Buna-N rubber, a molded or machined seat made of Teflon® or Neoflon® material, or other materials known in the art. A main valve spring 281 is housed in the first section 219 of the central bore 53 and contacts the top wall 213 of the central bore and the top of the first end 245 of the main valve member 241 to bias the main valve member downward in the central bore.

A valve stem 291 connected to the main valve member 241 has a first end 293 threadably received in the lower portion of the internal axial bore 243 in the main valve member and a threaded lower end 297 extending into the chamber 209 below the central bore 53. The valve stem 291 is formed with an external shoulder 299 in secure contact with the lower seal 275 of the main valve member 241 and an inner bore 301 in communication with the axial bore 243 of the main valve member. A main valve seat housing 309 is threadably connected to the fourth section 229 of the central bore 53 and extends from the central section 21 of the regulator body 3 into the piston chamber 209 spaced below the central bore. The valve seat housing 309 has an internal annular shoulder 311 that forms the main valve seat 313, outlet ports 315 spaced below the valve seat for directing the flow of gas past the seat into the piston chamber 209, and a central opening 317 axially aligned with the main valve member 241 for slidingly receiving the main valve stem 291. The main valve seat 313 is adapted for contact by the lower seal 275 held between the main valve member 241 and the valve stem 291 to prevent the flow of gas to the outlet ports 315 in the housing 309.

As shown in FIGS. 1 and 1B, a reciprocating piston 325 is slidable in the piston chamber 209 defined by the cylinder head 29 and has a central bore 327 that is threadably connected to the threaded lower end 297 of the valve stem 291. In the illustrated embodiment, the piston 325 is generally cylindric, having a first surface 329 spaced below the valve seat housing 309 to define an upper cavity 335 for receiving gas from the outlet ports 315 and a second surface 337 defining a lower cavity 341 between the piston 325 and the closed end 31 of the cylinder head 29. Preferably, the central bore 327 of the piston 325 is axially aligned with the main valve mechanism 201 such that gas from the pilot exit bore 51 enters the first section 219 of the central bore 53 of the body 3 and passes through the internal axial bore 243 of the main valve member 241, the inner bore 301 of the valve stem 291, and the central bore of the piston to reach the lower cavity 341 between the second surface 337 of the piston and the cylinder head 29. In the illustrated embodiment, the piston 325 has an offset bore 347 leading from the second surface 337 to a bleed opening 349 in the first surface 329 of the piston and a resilient O-ring 351 providing a seal between the piston and the cylinder head 29. The opening 349 allows a small amount of gas to pass from the lower cavity 341 to the upper cavity 335 as the piston 325 moves toward the closed end 31 of the cylinder head 29. Gas delivered to the lower cavity 341 under the constant pilot pressure regulated by the pilot valve mechanism 41 provides a constant gas pressure in the lower cavity 341 that provides a constant force acting on the second surface 337 of the piston 325 that tends to urge the piston upwards in the chamber 209. Since the piston 325, main valve stem 291, and main valve member 241 are operatively connected, upward movement of the piston results in separation of the lower seal 275 of the main valve member and the main valve seat 313 to allow the flow of gas past the main valve seat and through the outlet ports 315 leading to the upper cavity 335.

In operation, the inlet 5 of the regulator 1 receives a supply of gas at an inlet pressure from the upstream gas line 7. Generally, the regulator 1 functions to supply gas at a constant pressure reduced from the inlet pressure to satisfy the requirements of downstream equipment (not shown). As shown in FIGS. 1 and 1B, gas from the inlet 5 enters the central bore 53 through the inlet passageway 205 and pressurizes the annular cavity 251 that surrounds the main valve member 241. The pressurized gas in this cavity 251 exerts an upward force acting on the upper seal 261 and the first end 245 of the main valve member 241 and a downward force acting on the lower seal 275 and the second end 255 of the valve member. Preferably, the main valve mechanism 201 is configured such that these upward and downward forces are equal and opposite so that the main valve member 241 is balanced (i.e., the net axial force applied to the main valve member from the inlet gas pressure is zero). Because the inlet pressure to the regulator 1 does not apply a net axial force against the main valve member 241, the variable inlet pressure forces acting on the main valve member 241 are negated so that the main valve mechanism 201 is capable of delivering a constant outlet pressure at varying inlet pressures. However, it will be understood that the main valve mechanism 201 could be semi-balanced with the upper seal 261 having a smaller diameter than the lower seal 275 resulting in a net axial force from the inlet pressure acting on the lower seal that would supplement the force of the main valve spring 281 biasing the main valve member 241 against the main valve seat 313. Also, the main valve mechanism 201 could be semi-balanced with the upper seal 261 having a larger diameter than the lower seal 275 resulting in a net axial force from the inlet pressure acting on the upper seal that would oppose the force of the main valve spring 281 biasing the main valve member 241 against the main valve seat 313.

As shown in FIGS. 1 and 1A, gas from the inlet also pressurizes the pilot inlet bore 45 and the pilot housing bore 47. As discussed above, gas from the pilot inlet bore 45 enters the pilot housing 57 and is sealed against exit from the housing by the contact of the pilot valve member 85 and the pilot valve seat 79. The pilot valve control mechanism 161 is adjusted by turning the adjustment knob 163 to apply a selected constant downward force acting against the diaphragm 187. As shown in FIGS. 2 and 2A, this adjustment moves the diaphragm 187 into contact with the pilot valve stem 95 to force the pilot valve member 85 away from the pilot valve seat 79, which allows the pilot low pressure cavity 49 to pressurize. The gas pressure in the pilot low pressure cavity 49 applies an upward force against the diaphragm 187 equivalent to the downward force applied by spring 175 so that the diaphragm reaches an equilibrium position in contact with the valve stem 95. At the equilibrium position, the downward force of the spring 175 and the upward force from the gas in the pilot low pressure cavity 49 acting on the diaphragm 187 are balanced so that the diaphragm maintains a position in engagement with the valve stem 95 to hold the head 87 away from the pilot valve seat 79. At the equilibrium position the pilot valve 85 will allow a sufficient amount of gas through the pilot valve seat 79 to maintain the force balance acting on the diaphragm 187. The pilot pressure required to maintain the equilibrium position of the diaphragm 187 is determined by the setting of the adjustment knob 163 to select the corresponding downward force applied to the diaphragm by the spring 175.

Figure 3:
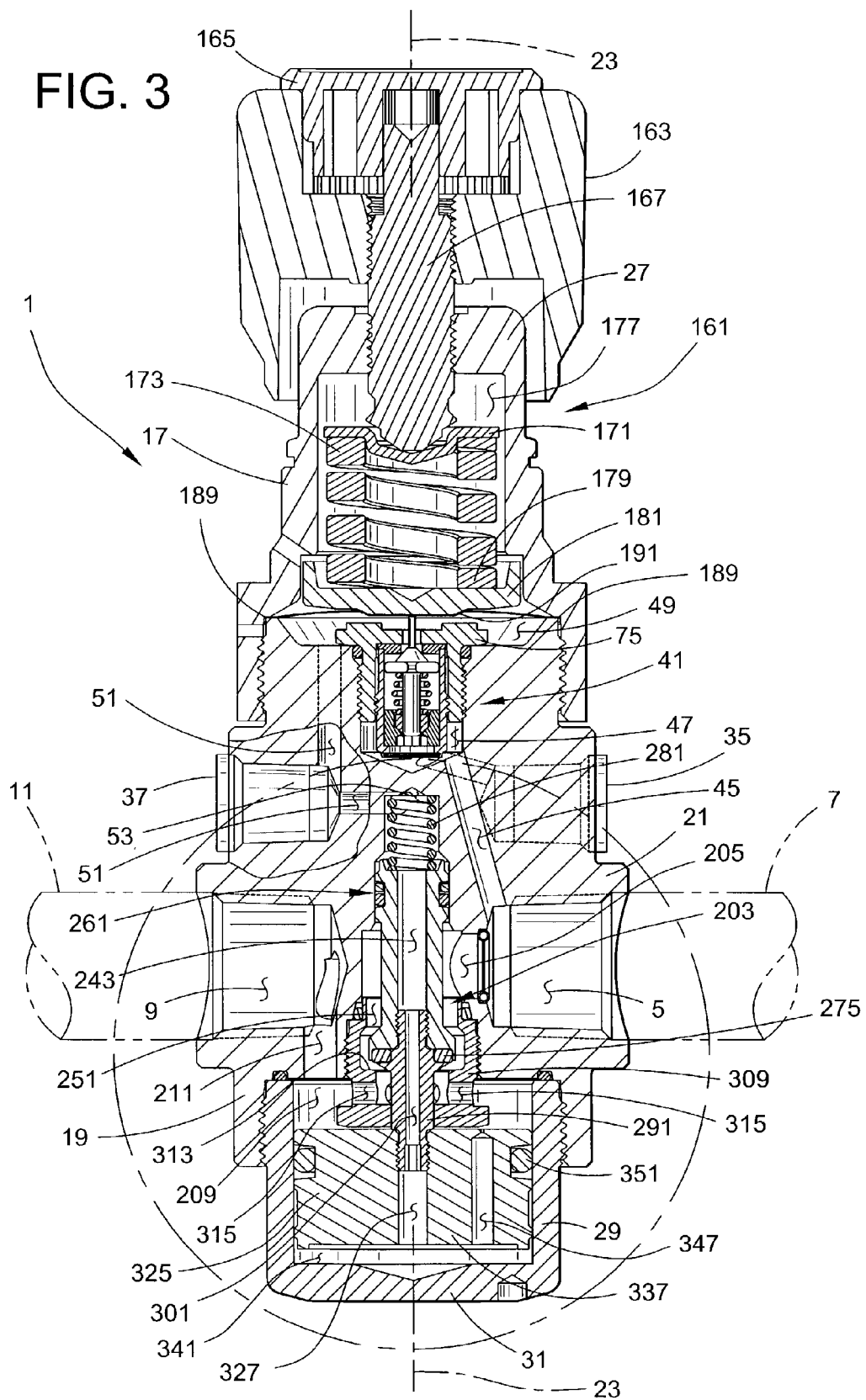
FIG. 3 is a vertical section of the pressure regulator with the pilot mechanism open and the main valve mechanism open.
Figure 3A:
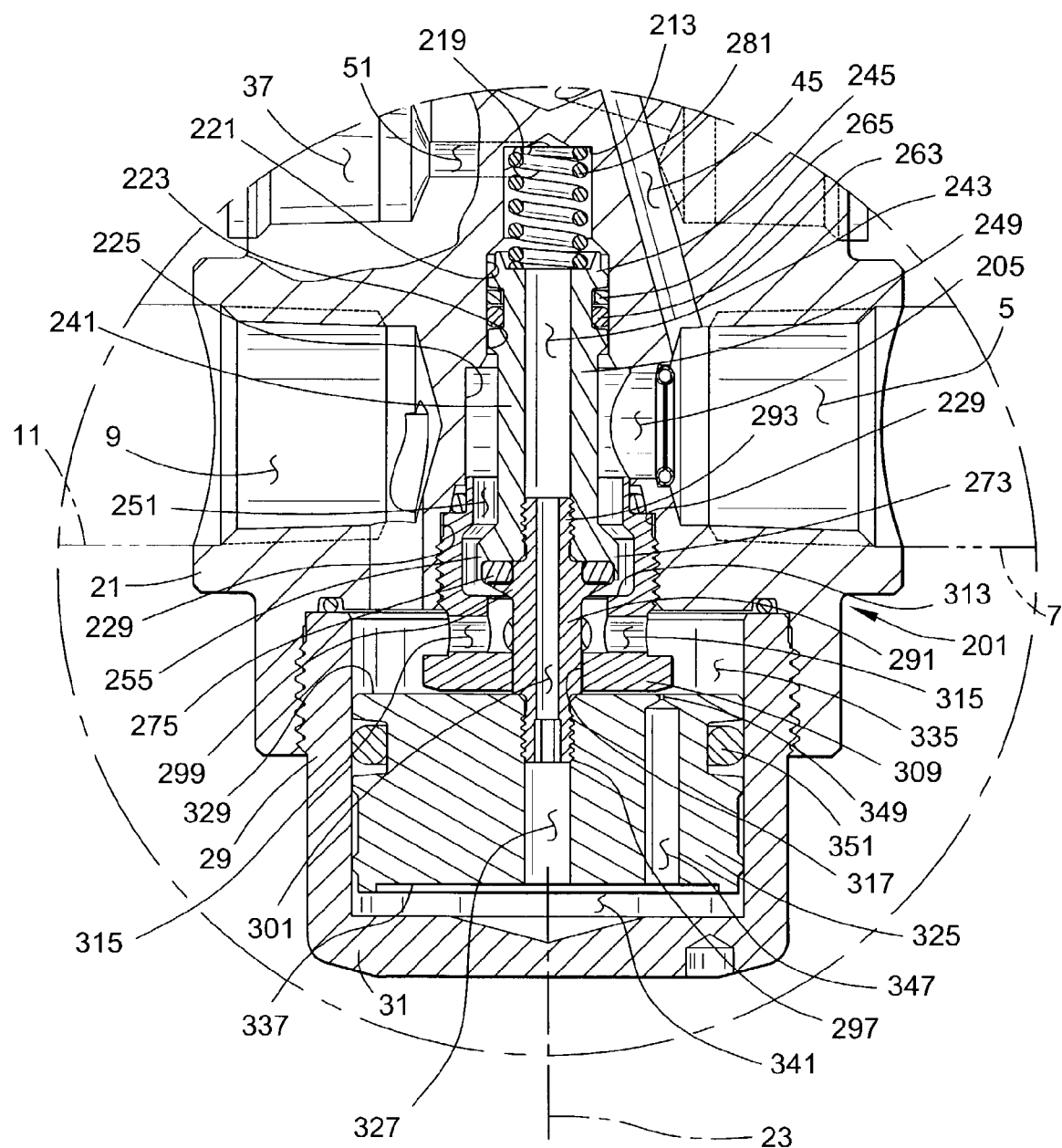
FIG. 3A is an enlarged section of FIG. 3 showing details of the main valve mechanism of the pressure regulator.

Gas under the set pilot pressure travels through the pilot exit passage 51 leading to the central bore 53 in the regulator body 3, the internal bore 243 of the main valve member 241, the inner bore 301 of the valve stem 291, and the central bore 327 of the piston 325 to fill the lower cavity 341 between the piston and the cylinder head 29. Because the pilot mechanism 41 delivers gas at a constant pressure corresponding to the setting of the pilot valve control mechanism 161, the gas in the lower cavity 341 applies a substantially constant upward force acting on the second surface 337 of the piston 325. As shown in FIGS. 3 and 3A, upward movement of the piston 325 causes the annular O-ring 275 on the second end 255 of the valve member 241 to separate from the valve seat 313 allowing gas to pass through the outlet ports 315 of the valve seat housing 309 and into the upper cavity 335 of the piston chamber 209 below the valve seat housing for exit through the outlet passageway 211 leading to the outlet 9 of the regulator 1. Upon lifting of the main valve 241, the upper cavity 335 pressurizes to counteract the pressure in the lower cavity 341 exerting an upward force on the piston 325. Once the force effects on the piston 325 are completely neutralized, the biasing force of the main valve spring 281 acts on the main valve member 241 to force the main valve member back into contact with the main valve seat 313. Because of the aforementioned balancing of inlet pressure forces acting on the main valve member 241, the biasing force of the main valve spring 281 acts to close the main valve 201. As gas is consumed downstream of the regulator 1, the outlet flow from the regulator causes the pressure in the upper cavity 335 to begin to drop causing a slight force imbalance on the piston 325. The slight force imbalance on the piston 325 causes the piston to rise and the main valve member 241 to lift off the seat 313 allowing gas to pressurize the upper cavity 335 and restore the force balance on the piston. As gas is consumed by the downstream equipment, a constant outlet pressure is maintained by the cyclical movement of the piston 325 which opens and closes the main valve member 241 to maintain the force balance on the piston. It should be noted that the increased volume in the lower cavity 341 when the piston 325 is raised as well as the small volume of gas that exits the lower cavity through the bleed opening 349 causes small fluctuations in the pilot pressure causing the pilot valve mechanism 41 to cycle in order to maintain the pilot pressure at the corresponding setting of the pilot valve control mechanism 161.

The outlet pressure delivered by the regulator 1 is adjusted by changing the setting of the adjustment knob 163 on the pilot valve control mechanism 161. Turning the knob 163 in one direction advances the adjusting screw 167 to further compress the spring 175, thereby increasing the downward force exerted on the diaphragm 187 of the pilot valve mechanism 41 and increasing the pilot pressure applied to the piston 325. Contrastingly, turning the knob 163 in the opposite direction decreases the force exerted on the diaphragm 187 and decreases the pilot pressure acting on the piston 325. Increasing or decreasing the pilot pressure applied to the second surface 337 of the piston 325 will correspondingly change the pressure in the upper cavity 335 required to balance the forces acting on the piston. In this manner the regulator 1 of the present invention including the internal pilot mechanism 41 regulating the pilot pressure acting on the piston 325 effectively regulates gas pressure in the upper cavity 335 leading to the outlet 9 of the regulator.

The arrangement of the present invention, in which the pilot mechanism 41 is integral with the body 3 of the regulator 1, results in a compact regulator design that may be easily installed. Installation of the regulator 1 of the present invention is accomplished simply by connecting the upstream gas line 7 to the inlet 5 of the regulator and connecting the downstream gas line 11 to the outlet 9 of the regulator. Optional high pressure and low pressure gauges (not shown) may be connected to the high pressure port 35 and the low pressure port 37 to monitor the inlet and outlet pressures of the regulator 1. The compact size and light weight of the regulator 1 also simplifies the structural mounting requirements of the regulator. In existing dome loaded regulators requiring separate external pilot regulators, a mounting bracket having a larger base is required to accommodate both regulators. In the present invention, the pilot mechanism 41 and pilot valve control mechanism 161 are integrally attached to the regulator body 3 that houses the main valve mechanism 201 such that the regulator 1 requires less mounting space allowing a more compact mounting bracket with simplified structural support requirements. In one embodiment, the regulator 1 has a height of about 7.5 inches, a maximum diameter of about 2.5 inches, and an approximate weight of about 5.0 lbs., but it will be understood that these specifications can vary based on the specific pressure and flow requirements of the regulator.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense. For example, the pilot valve mechanism 41 and the pilot valve control mechanism 161 of the regulator 1 could be located below the main valve mechanism 201 with the pilot passage 43 passing up through the main valve mechanism to reach the piston 325. The pilot valve mechanism 41 may comprise other valve and seat configurations that may be entirely or partially housed in the center section 21, the first end section 17, or the second end section 19 of the body 3. Also, the first end section 17 and/or the second end section 19 of the body 3 could be offset from longitudinal axis 23 such that they are not axially aligned with the center section 21. For example, the pilot valve mechanism 41 could be configured such that the pilot valve exit bore 51 is generally coaxial with the central bore 53 in the body 3. The regulator body 3 including the first end section 17, second end section 19 and center section 21 may have other shapes including a cube, a pyramid, or other geometric solids. The bonnet 27 defining the first end section 17 of the regulator body 3 and/or the cylinder head 29 defining the second end section 19 could be integral with the central section 21 of the body. The adjustment knob 163 of the pilot valve control mechanism 161 may be replaced by a locking nut for setting the desired pilot pressure by fixing the position of the adjusting screw 167. Furthermore, the main valve mechanism 201 may have alternative configurations where the lower seal 275 is mounted on the valve seat 313 or where the lower seal is integral with either the main valve member 241 or the valve seat housing 309. The piston 325 may be an integral part of the main valve member 241, or the valve stem 291 could be an integral part of the main valve member allowing direct attachment of the piston to the main valve member.

What is claimed is:

1. A gas pressure regulator comprising:
   a regulator body having an inlet for connection to an upstream gas line for flow of gas into the regulator body under pressure and an outlet for connection to a downstream gas line for flow of gas out of the regulator body at a reduced pressure,
   a pilot mechanism in the regulator body comprising a pilot passage communicating with said inlet, a pilot valve seat in the pilot passage, a pilot valve member in the pilot passage movable relative to the seat, and a pilot control device for positioning the pilot valve member and the pilot valve seat relative to one another to adjust the pressure of gas delivered past the pilot valve seat to a desired pilot gas pressure,
   a main valve mechanism in the regulator body for regulating the flow of gas under pressure from the inlet to the outlet, said main valve mechanism comprising a main flow passage connecting said inlet and outlet of the regulator body, a main valve seat in the main flow passage, and a main valve member in the main flow passage movable relative to the main valve seat,
   a piston chamber in the regulator body, and
   a piston operatively connected to the main valve member and movable in the piston chamber,
   said main valve member having a passageway therein providing pressure communication between said piston chamber and said pilot passage at a location downstream from the pilot valve seat whereby said pilot gas pressure is adapted to move the piston and thereby position the main valve member in relation to the main valve seat for regulating the pressure of the gas delivered from the inlet to the outlet of the regulator.

2. The pressure regulator as set forth in claim 1 wherein said regulator body has a first end section, a second end section, and a center section generally between the end sections.

3. The pressure regulator as set forth in claim 2 wherein said end and center sections are generally coaxial with respect to a central longitudinal axis of the body.

4. The pressure regulator as set forth in claim 2 wherein said first and second end sections are threadably connected to said center section.

5. The pressure regulator as set forth in claim 4 wherein said first end section contains parts of the pilot mechanism, said middle section contains parts of the main valve mechanism, and said second end section contains said piston chamber and piston.

6. The pressure regulator as set forth in claim 5 wherein said pilot control device comprises a diaphragm in the pilot passage downstream of the pilot valve seat adapted for contact with said pilot valve member, and an adjustment mechanism for adjusting the position of the diaphragm to vary the position of the pilot valve member relative to the pilot valve seat.

7. The pressure regulator as set forth in claim 2 wherein the main valve member comprises a valve body sealingly engageable with the main valve seat, and a stem extending endwise from the valve body having a connection with said piston.

8. The pressure regulator as set forth in claim 7 further comprising a valve seat housing removably connected to said center section of the regulator body, said housing having an internal annular shoulder forming said main valve seat, an opening for receiving said main valve stem, and outlet ports for flow of gas out of the housing to said regulator outlet.

9. The pressure regulator as set forth in claim 8 wherein said valve body has a first end sealingly slidable in a bore in the center section of the regulator body and a second end adjacent said main valve seat, said first and second ends of the valve body being exposed to gas flowing into said regulator inlet and being configured such that forces exerted by said gas acting on the first and second ends are balanced.

10. The pressure regulator as set forth in claim 9 wherein said pilot passage is in communication with said bore.

11. The pressure regulator as set forth in claim 10 further comprising a spring in said bore urging said main valve member toward said main valve seat.

12. The pressure regulator as set forth in claim 11 wherein said main valve member passageway is coaxial with said bore.

13. The pressure regulator as set forth in claim 12 further comprising an O-ring around said first end of said valve body for sealing against a wall of the bore.

14. The pressure regulator as set forth in claim 1 wherein said piston has a first surface facing said main valve member and a second opposite surface facing away from said main valve member, and a passage through the piston communicating with said passageway in the main valve member to permit said pilot gas pressure to act on said second surface of the piston to move the piston toward the main valve seat with resulting movement of the main valve member away from the main valve seat.

15. The pressure regulator as set forth in claim 14 wherein said piston passage and passageway in the main valve member are generally coaxial.

16. The pressure regulator as set forth in claim 1 wherein said main valve member comprises a valve body having a first end sealingly slidable in a bore in the regulator body, and a second end adjacent said main valve seat, said first and second ends of the valve body being exposed to gas flowing into said regulator inlet.

17. The pressure regulator as set forth in claim 16 wherein said main valve mechanism is configured such that the axial force exerted by said gas acting on the first end is equal and opposite to the axial force executed by said gas on the second end, such that a net axial force from the inlet gas is not applied to the main valve member.

18. The pressure regulator as set forth in claim 16 wherein said main valve mechanism is configured such that the axial force exerted by said gas acting on the first end is not equal to the axial force executed by said gas acting on the second end, such that a net axial force from the inlet gas is applied to the main valve member.

19. The pressure regulator as set forth in claim 16 wherein said pilot passage is in communication with said bore.

20. The pressure regulator as set forth in claim 19 further comprising a spring in said bore urging said main valve member toward said main valve seat.

21. The pressure regulator as set forth in claim 20 further comprising a valve seat housing threaded in said bore, said housing having an internal annular shoulder forming said main valve seat and outlet ports for the flow of gas out of the housing to said regulator outlet.

22. The pressure regulator as set forth in claim 21 wherein said passageway in said main valve member is coaxial with said bore.

23. The pressure regulator as set forth in claim 22 further comprising an O-ring around said first end of said valve body for sealing against a wall of the bore.

24. The pressure regulator as set forth in claim 2 wherein said pilot valve mechanism further comprises a housing retained in a bore in said center section, said housing containing said pilot valve member, and a closure at one end of the housing forming said pilot valve seat.

25. The pressure regulator as set forth in claim 24 further comprising a spring in said housing urging said pilot valve member toward said pilot valve seat.

26. The pressure regulator as set forth in claim 25 wherein said closure has an opening and said pilot valve member has a stem extending through said opening for engagement by said pilot valve control mechanism.

* * * * *